United States Patent [19]

Ichiyanagi

[11] 3,971,974

[45] July 27, 1976

[54] APPARATUS FOR CONTROLLING THE SYNCHRONOUS DRIVE FOR DIRECT-CURRENT MOTORS

[75] Inventor: Toshikazu Ichiyanagi, Tokyo, Japan

[73] Assignee: Canon Kabushiki Kaisha, Tokyo, Japan

[22] Filed: May 7, 1974

[21] Appl. No.: 467,741

[30] Foreign Application Priority Data

May 9, 1973 Japan.............................. 48-51377

[52] U.S. Cl................................ 318/341; 318/318; 318/327
[51] Int. Cl.²............................................. H02P 5/00
[58] Field of Search ........... 318/341, 599, 318, 328, 318/327

[56] References Cited
UNITED STATES PATENTS

| | | | |
|---|---|---|---|
| 2,809,339 | 10/1957 | Guggi | 318/327 |
| 3,079,539 | 2/1963 | Guerth | 318/599 |
| 3,192,461 | 6/1965 | Hohne, Jr. | 318/318 |
| 3,382,423 | 5/1968 | Clark | 318/318 |
| 3,577,057 | 5/1971 | Dyer | 318/341 X |
| 3,812,410 | 5/1974 | Schaub et al. | 318/328 |

*Primary Examiner*—B. Dobeck
*Attorney, Agent, or Firm*—Fitzpatrick, Cella, Harper & Scinto

[57] ABSTRACT

A controlling apparatus adapted to drive a D.C. motor at a constant speed in synchronization with an external reference signal. In order to detect rotational speed of the D.C. motor, a tachogenerator is provided, and means for generating a reference signal is also provided. A comparator circuit is provided to compare a frequency signal from the tachogenerator with a reference frequency signal from the reference signal generation means. A current controlling semi-conductor, which is turned ON or OFF by an output from the comparator circuit, is connected in series with the D.C. motor and the power source. With this arrangement, a voltage applied to the D.C. motor may be varied in response to conduction and non-conduction of the current controlling semi-conductor to enable the D.C. motor to initiate self-starting and to be driven at a constant speed synchronously with a reference signal after it has reached its synchronous speed.

12 Claims, 15 Drawing Figures

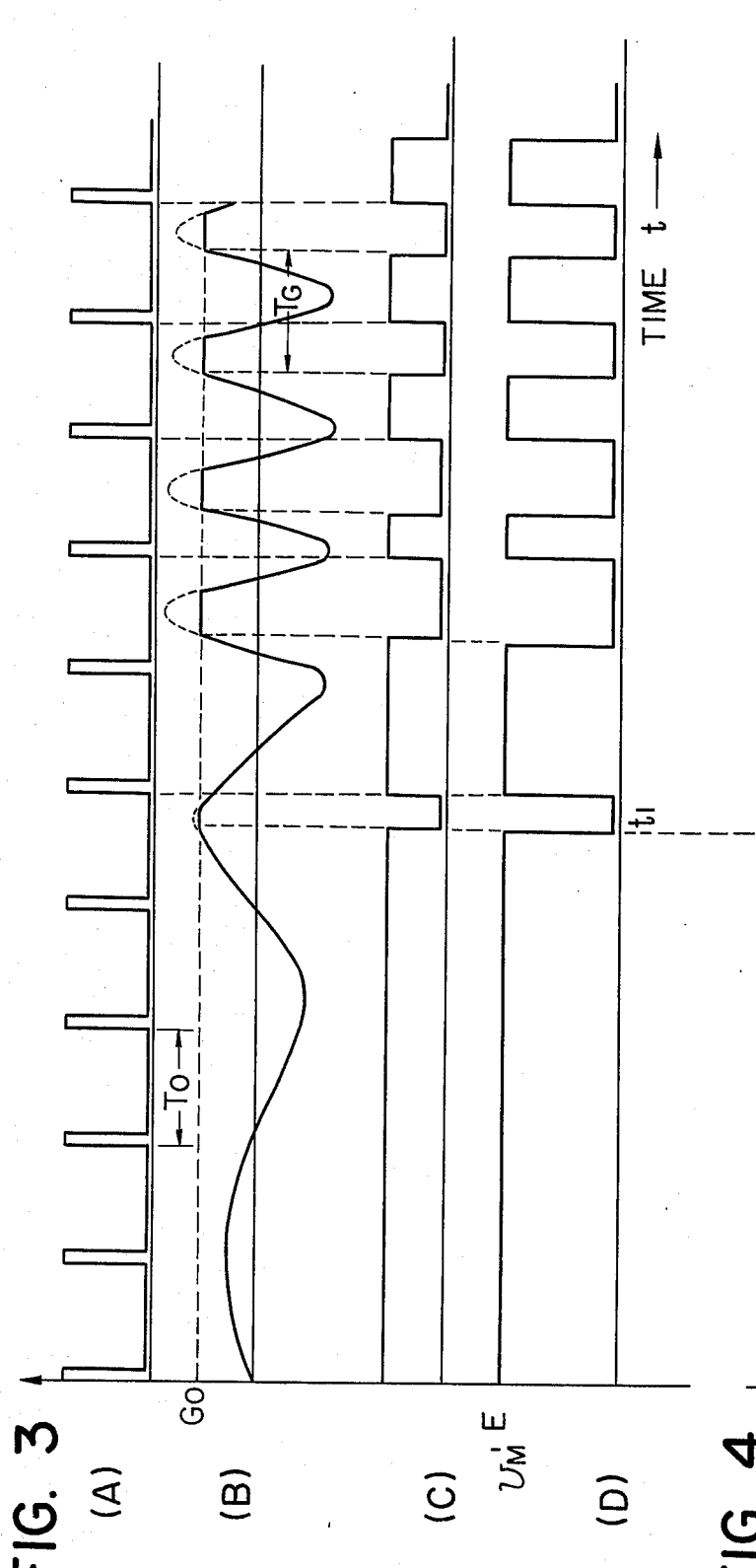
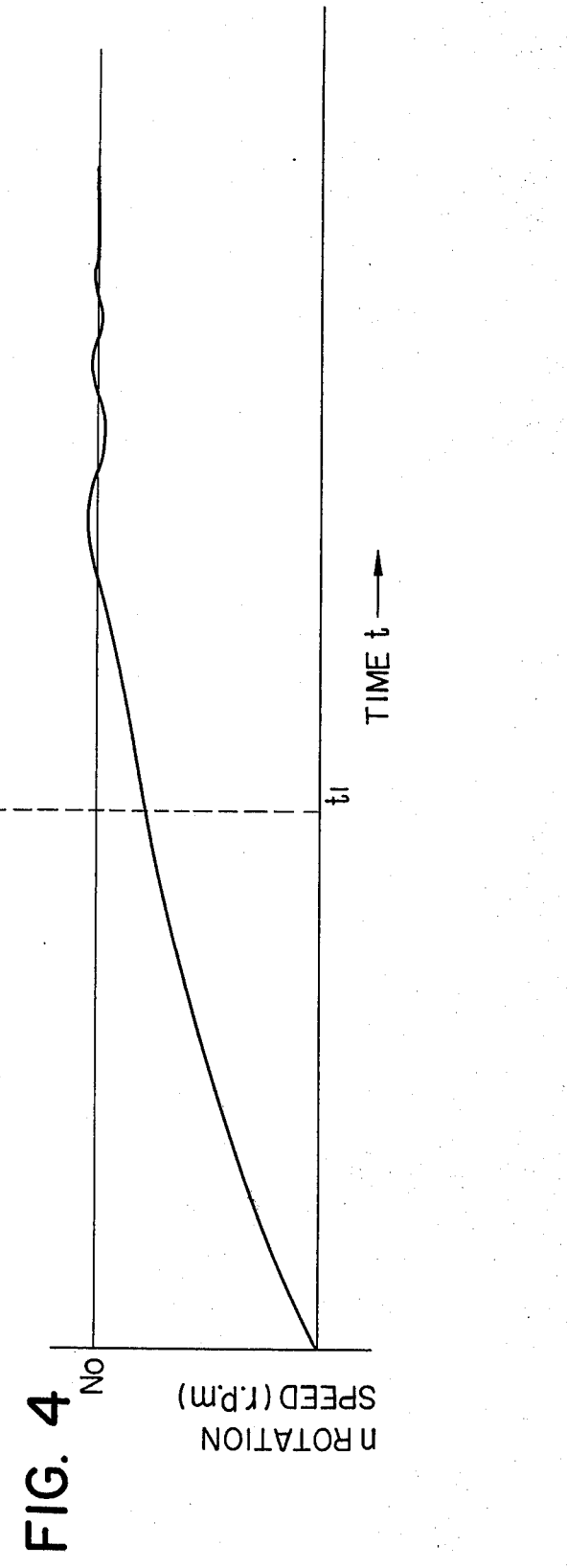

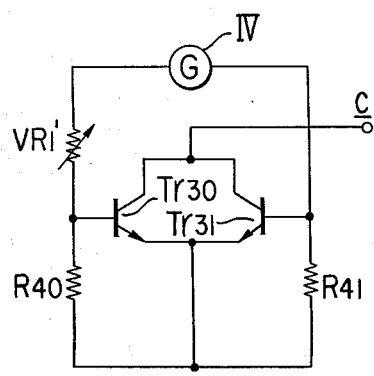
FIG. 10A
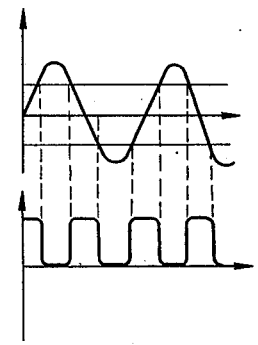
FIG. 10B
FIG. 10C
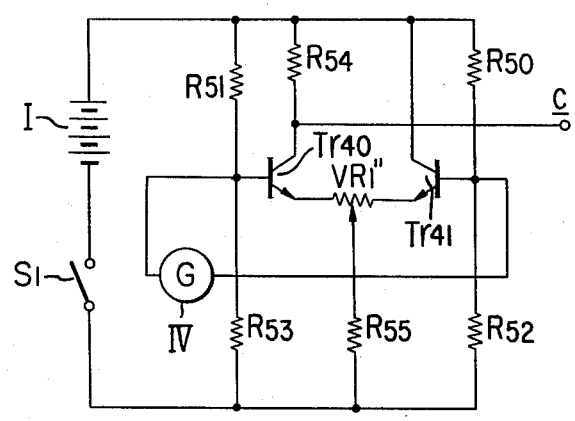
FIG. 11A
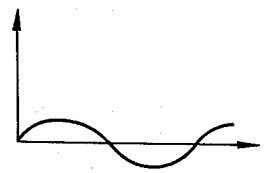
FIG. 11B
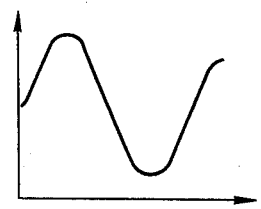
FIG. 11C

APPARATUS FOR CONTROLLING THE SYNCHRONOUS DRIVE FOR DIRECT-CURRENT MOTORS

BACKGROUND OF THE INVENTION

1. Field of the Invention

This invention relates to an apparatus for controlling a synchronous drive for direct-current motors, which apparatus provides two characteristics, that is, the self-starting characteristic which is inherent in D.C. motor and the constant speed characteristic which is inherent in a synchronous motor.

2. Description of the Prior Art

Conventional D.C. motors may obtain a great starting torque, but the number of revolutions per minute thereof varies with fluctuations of load. Also, conventional synchronous motors have both merits and demerits in that they may have good constant speed compared to the D.C. motors but they may not be able to produce a sufficient starting torque, to effect self-starting. On the other hand, conventional induction motors may eliminate those disadvantages as noted above with respect to the above-described two kinds of motors to some extent, but induction motors are not able to obtain sufficiently both the starting torque characteristic and constant speed characteristics, and their speed is unavoidably lowered due to slip.

Therefore, there has existed a need for rotary motors which can provide great starting torque and sufficient constant speed.

Methods heretofore proposed to fulfill the requirements as noted above are:

1. a method for driving a D.C. motor at a synchronous speed in which when a rotor of the motor has reached a predetermined number of revolutions per minute, a synchronous signal from a synchronized device, externally provided, is transmitted to the D.C. motor thereby causing it to rotate at a synchronous speed; and 2. a method in which a specific starting device is employed for a synchronous motor.

However, in these methods, the construction of the motor and its accessory devices becomes complicated, or additional operation is needed at the time of start, requiring the change from a D.C. machine to a synchronous machine, automatic operation of which has been difficult.

SUMMARY OF THE INVENTION

The present invention overcomes the disadvantages noted above with respect to prior art motors and has as its object to provide an apparatus for controlling a synchronous drive for D.C. motors, which provides two characteristics, that is, the excellent self-starting characteristic of a D.C. motor, and the constant speed characteristic as a synchronous motor after it has reached a synchronous speed.

It is a further object of the invention to provide an apparatus for controlling a synchronous drive for D.C. motors, which comprises means for generating a frequency signal corresponding to the rotational speed of the D.C. motor for the synchronous driving of the D.C. motor, means for generating a reference frequency signal for the synchronous driving of said D.C. motor, and means for generating a controlling signal for driving said D.C. motor by comparison of frequency signals from both those generating means as described, whereby said controlling signal is utilized to effect self-starting of the D.C. motor and synchronous driving thereafter.

It is another object of the invention to provide an apparatus for controlling the synchronous drive for D.C. motors, including an electric motor controlling device comprising a D.C. power source, a D.C. motor, a comparator circuit such as flip-flops, means for detecting the rotational speed of said D.C. motor, and a reference signal generator, wherein the D.C. motor and a current controlling semi-conductor are connected in series with said D.C. power source, the output of said comparator circuit, into which outputs from said means for detecting rotational speed and said reference signal generator are applied, is applied to said current controlling semiconductor, and the switching action of said controlling semiconductor is utilized to effect self-starting of the D.C. motor and thereafter driving which is synchronous with the output of said reference signal generator.

It is yet another object of the invention to provide an apparatus for controlling the synchronous drive for D.C. motors, comprising a D.C. power source, a D.C. motor, a comparator circuit, means for detecting the rotational speed of said D.C. motor, and a reference signal generator for synchronous driving, wherein means for varying an output from said means for detecting the rotational speed and means interlocked with said varying means for varying a frequency generated from said reference signal generator are provided so as to transfer the D.C. motor to the mode of synchronous driving quickly after it has self-started and at the same time to vary the speed of synchronous revolution itself, thereby obtaining various speeds of synchronous driving when necessary.

It is still another object of the invention to provide an apparatus for controlling the synchronous drive for D.C. motors comprising means for maintaining a voltage applied to the D.C. motor at a predetermined level so that even if load fluctuation occurs for some reason, the D.C. motor, once having reached a synchronous speed, may be immediately returned to its predetermined synchronous speed.

It is a further object of the invention to provide an apparatus for controlling the synchronous drive for D.C. motors, in which a crest value of an applied voltage may be selected so that its duty factor is made approximately one half, said duty factor being required when an intermittent applied voltage is applied to drive the D.C. motor at a synchronous speed.

Various other objects, features and advantages of the invention will be apparent from the detailed description of the preferred embodiments thereof set forth hereinafter and shown in the accompanying drawings.

BRIEF DESCRIPTION OF THE DRAWINGS

FIGS. 3(A)–(D) are graphic presentations with an axis of abscissa indicative of time and an axis of ordinate indicative of level of output signals for the purpose of explanation of a synchronous driving mode in accordance with the present invention;

FIG. 4 is a graphic presentation showing variation by time of the rotational speed of a D.C. motor in accordance with the present invention;

FIG. 10A is a circuit diagram showing one preferred embodiment of an output signal dividing circuit means for detecting rotational speed of the D.C. motor applicable to the electric circuits shown in FIGS. 2 and 7, and FIGS. 10B and C illustrate wave-forms of signals thereof; and FIG. 11A is a circuit diagram showing one preferred embodiment of an output signal amplification circuit means for detecting rotational speed of the D.C. motor applicable to the electric circuits shown in FIGS. 2 and 7, and FIGS. 11B and C illustrate wave-forms of signals thereof.

DESCRIPTION OF THE PREFERRED EMBODIMENTS

Figure 1:
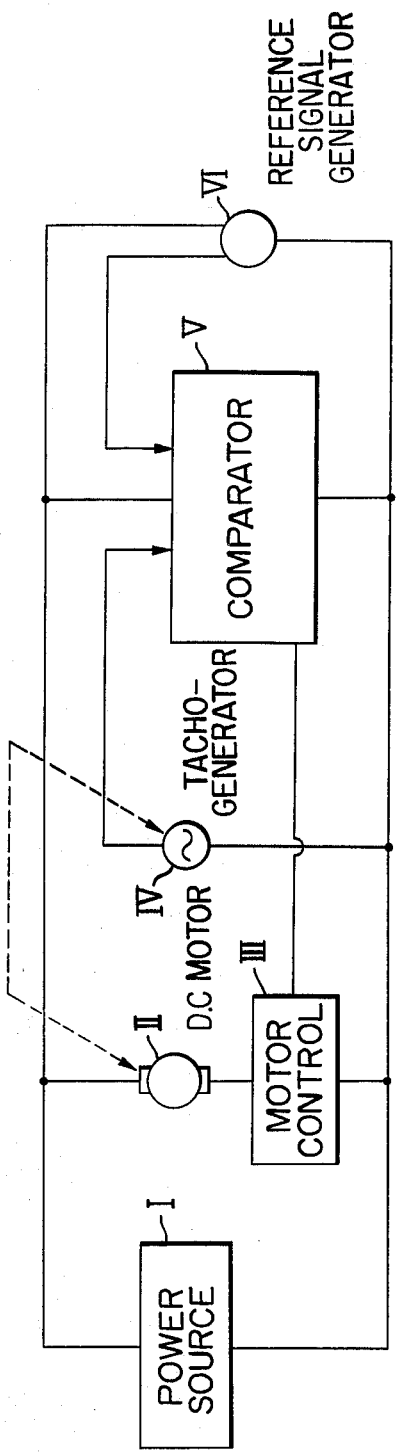
FIG. 1 is a block diagram of one preferred embodiment of an apparatus constructed in accordance with the present invention.

FIG. 1 is a block diagram of one preferred embodiment of an apparatus constructed in accordance with the present invention, and the apparatus comprises a D.C. power source I, a D.C. motor II, a motor current controlling semi-conductor III connected in series with said power source and said D.C. motor, and means IV for detecting rotational speed of the motor such as a tachogenerator which produces an A.C. output in proportion to the rotational speed of said D.C. motor. The apparatus further comprises a comparator circuit such as a bistable multi-vibrator, said circuit receiving, for the purpose of comparing signals, a signal from said means IV for detecting rotational speed and a signal from a reference signal generator which generates a signal with constant period, later described, and the comparator circuit being connected such that outputs therefrom are supplied to said current controlling semi-conductor.

Figure 2:
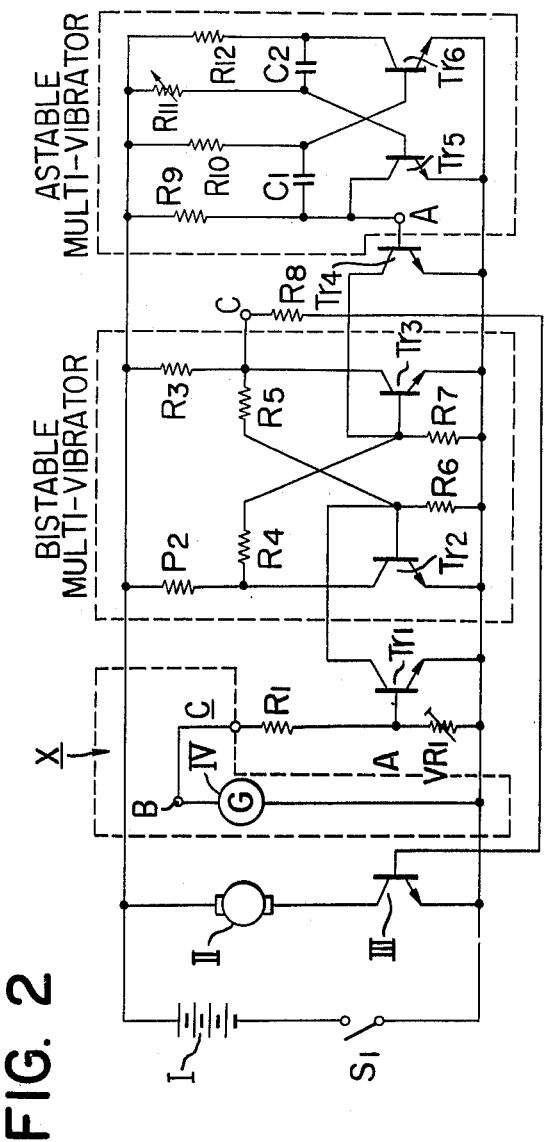
FIG. 2 is a circuit diagram showing one preferred embodiment of an electric circuit connection further detailed of the contents of the block diagram shown in FIG. 1.

FIG. 2 is a circuit diagram showing one embodiment of an electric circuit connection further detailed of the block diagram shown in FIG. 1. Referring to FIG. 2, there are shown a D.C. power source I, a D.C. motor II, and a current controlling semi-conductor III connected in series with said power source and said motor, NPN transistors being illustrated in the drawing. A main switch is indicated at $S_1$. The circuit shown in FIG. 2 further comprises NPN transistors $Tr_1$ through $Tr_6$, resistors $R_1$ through $R_{12}$, the resistor $R_{11}$ being the variable resistor, capacitors $C_1$ and $C_2$, and a variable resistor $VR_1$ for varying the output of the tachogenerator. Among them, the elements such as the transistors $Tr_5$ and $Tr_6$, the capacitors $C_1$ and $C_2$, and the resistors $R_9$ through $R_{12}$ comprise an astable multi-vibrator which produces a pulse signal with constant period, and therefore this serves as a reference signal generator in this specific embodiment. Also, the transistors $Tr_2$ and $Tr_3$, and the resistors $R_2$ through $R_7$ comprise a bistable multi-vibrator to form the aforesaid comparator circuit, output terminal of which is connected through the resistor $R_8$ to an input base terminal of said current controlling semi-conductor III.

The operation of the circuit diagram shown in FIG. 2 is as follows: When the main switch $S_1$ is closed, current is supplied to said astable multi-vibrator, which is then oscillated to place the transistor $Tr_4$ connected with the output terminal thereof, in ON condition. Since the output terminal of the transistor $Tr_4$ is connected with one input of said bistable multi-vibrator, the base potentional of the transistor $Tr_3$ in the bistable multi-vibrator drops as the transistor $Tr_4$ shifts to its ON condition so that the transistor $Tr_3$ is brought into the OFF condition. On the other hand, the other transistor $Tr_2$ is in the ON condition. Since the collector potential of the transistor $Tr_3$ is high, the base potential of the controlling transistor III is made to rise through the resistor $R_8$ to place the transistor III in ON condition so that a high voltage is applied to the D.C. motor II through the D.C. power source I, thus increasing the speed of the motor.

On the other hand, when the number of revolutions per minute of the motor increases to more than a predetermined number of synchronous revolutions per minute (rpm), the output of the tachogenerator has its pulse intervals (in an A.C. tachogenerator, the output is differentiated and rectified into a pulse form) shortened so that the transistor $Tr_1$, which receives said output, is turned to its ON condition. Then, since the base potential of the transistor $Tr_2$ drops, the transistor $Tr_2$ is shifted to its OFF condition so that its collector potential rises, causing the flow of current through the resistor $R_4$ to the base of the transistor $Tr_3$, whereby the transistor $Tr_3$ is turned to ON condition, the collector potential of which drops. Thus, the base potential of the controlling transistor III also drops so that the transistor III is turned to its OFF condition. Therefore, an applied voltage from the power source to the motor II will drop so that the number of revolutions per minute of the motor decreases. Then, a pulse signal from the astable multi-vibrator is applied to the base of the transistor $Tr_4$ to place the transistor in ON condition, thus again shifting the transistor $Tr_3$ to its OFF condition. Then, since the collector potential becomes high, the transistor $Tr_2$ is turned to ON condition and the controlling transistor III is turned to ON condition to raise the voltage applied to the motor II, whereby the motor increases its speed. When the number of revolutions per minute of the motor II reaches the predetermined number of synchronous revolutions per minute by repetition of such an action as desciled, the frequency of the tachogenerator is substantially equalized to the frequency of the astable multi-vibrator, and the output (the collector potential of the transistor $Tr_3$) of the bistable multi-vibrator becomes low in potential in response to the signal input from the tachogenerator IV and becomes high in potential in response to the signal input from the astable multi-vibrator, such high and low relations being repeated and maintained. If the output of the bistable multi-vibrator is of high potential, the controlling transistor III is energized to raise the applied voltage of the motor II, while if it is of low potential, the controlling transistor III is deenergized to drop the applied voltage of the motor II. In other words, in the mode of synchronous driving, the applied voltage to the motor II increases in response to the output signal from the astable multi-vibrator but it decreases in response to the output signal from the tachogenerator.

The mode of controlling the voltage applied to wave-forms of the motor II will now be described with reference to FIG. 3. An output pulse signal of the astable multi-vibrator is a train of pulse signals having a constant period $T_o$, as shown in FIG. 3(A), an output wave-form at the terminal A shown in FIG. 2 being illustrated. On the other hand, in the case where the rotational speed of the D.C. motor II is detected by use of an A.C. tachogenerator, an A.C. pulse signal as shown in FIG. 3(B) is produced at the terminal B shown in FIG. 2. Immediately after the main switch $S_1$ has been closed and before the rotational speed of the motor has reached a predetermined synchronous speed as shown in FIG. 4, the period of the output signal from the tachogenerator is longer than the period $T_o$ of the aforementioned signal and is also lower in level. The switching transistor $Tr_1$ shown in FIG. 2 is turned to ON condition and energized when the A.C. tachogenerator has its output in excess of a predetermined level, so that the bistable multi-vibrator receives the signal on the collector potential thereof. This switching level is indicated at $G_o$ in FIG. 3(B). Since the bistable multi-vibrator is merely supplied with the aforesaid reference signal from the astable multi-vibrator until the output of the tachogenerator first reaches the level $G_o$, at time $t_1$, the output terminal C of the bistable multivibrator is maintained at a high potential as shown in FIG. 3(C), whereby the applied voltage to the motor II is maintained at a level of high voltage E as indicated at $V_{M'}$ in FIG. 3(D). As a result, the D.C. motor continues to run at an increased speed as shown in FIG. 4 and is cut off for a short period after a lapse of time $t_1$ until the next successive reference signal enters the bistable multi-vibrator, and again the motor is supplied with a high potential. In this way, the D.C. motor is rapidly accelerated to a predetermined speed within an extremely short period. When it reaches such a speed as described, the period $T_o$ of a train of reference signals from the astable multi-vibrator substantially coincides with the period $T_G$ of the output signal from the A.C. tachogenerator so that the applied voltage $V_{M'}$ to the motor repeats supplying and cutting off of power to the motor at substantially equal time intervals, thus maintaining the motor at a synchronous speed. Even if the motor is momentarily varied in its speed due to fluctuation of load, the rotational speed of the motor is immediately caused to return to $N_o$ by utilization of a controlling signal (See FIGS. 3(C) and (D)) obtained by comparing both frequency signals as described above. Therefore, once the D.C. motor has reached a synchronous speed it may function as a synchronous motor.

Figure 5:
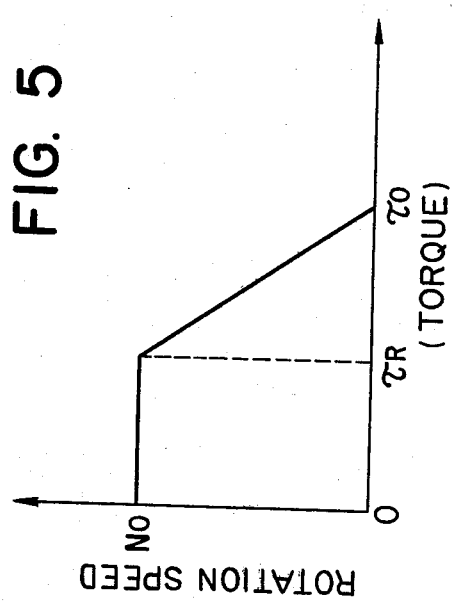
FIG. 5 is a graphic presentation showing the characteristics of torque vs. number of revolutions per minute for the D.C. motor in accordance with the present invention.

FIG. 5 is a graphic presentation showing the characteristic of torque vs. number of revolutions for the D.C. motor controlled by the apparatus of the present invention having the above-mentioned construction and operation. As shown, while the number of revolutions per minute of the motor changes from a point as indicated at 0 to a predetermined number of synchronous revolutions per minute as indicated at $N_o$, the motor varies from a maximum starting torque $\tau_o$ to the torque $\tau_R$, and within this span, the D.C. motor controlled by the apparatus in accordance with the present invention functions as a complete D.C. motor. Further, after the motor has reached a predetermined number of revolutions per minute $N_o$, the number of revolutions per minute of the motor is maintained at a substantially predetermined number of revolutions per minute $N_o$ even if the torque is varied from 0 to $\tau_R$ due to the fluctuation of load, etc., and within this span, the D.C. motor controlled by the apparatus in accordance with the present invention functions as a synchronous motor. That is to say, until the motor speed reaches a synchronous speed after start up, the output level of the tachogenerator is low so as not to be able to obtain a voltage enough to reset the bistable circuit, and the motor is kept supplied with an output signal from the controlling means III and it thus acts as a D.C. motor, while after the motor has reached a synchronous speed, the motor may thereafter function so as to maintain synchronous rotation through the aforesaid operation.

It should also be understood that an A.C. output wave-form of the A.C. tachogenerator may be formed and then differentiated to form a positive or negative pulse-like signal, which is applied to one input terminal of the comparator circuit in the form of a train of pulse signals for indicating the speed of motor.

Figure 6:
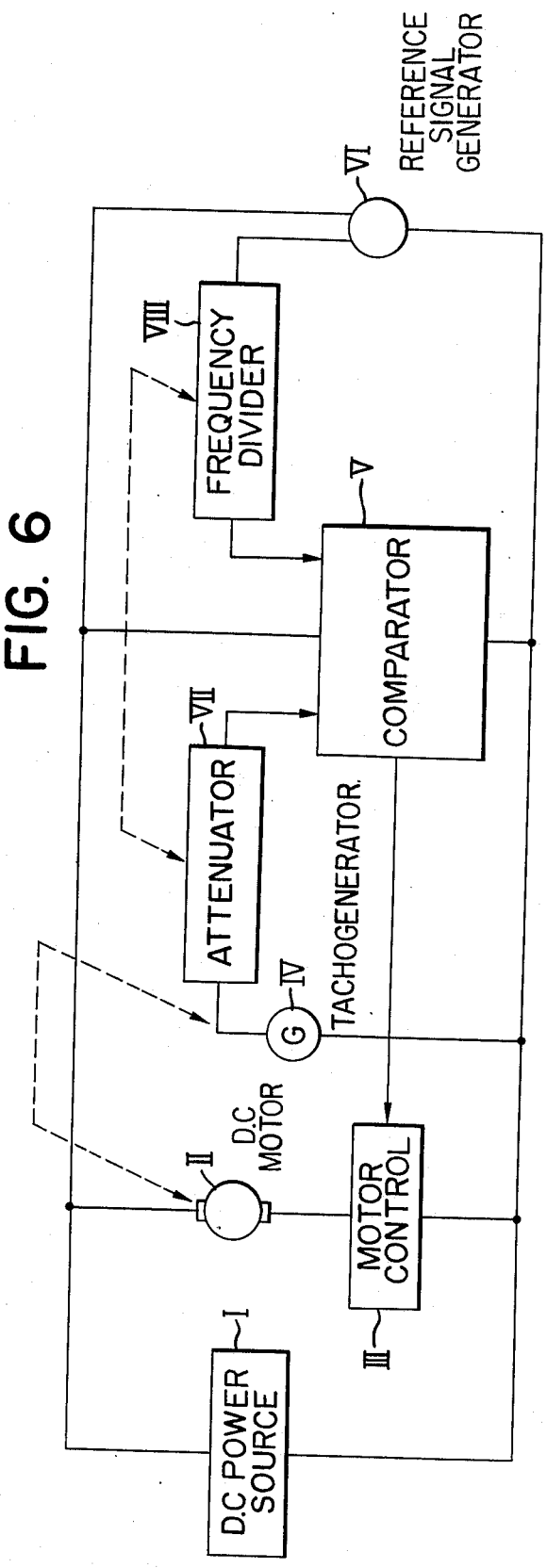
FIG. 6 is a block diagram of another embodiment further modified from the block diagram shown in FIG. 1.

FIG. 6 is a block diagram modified from the block diagram shown in FIG. 1 and illustrating the controlling apparatus in which the number of revolutions per minute of the D.C. motor is varied. In FIG. 6, those elements which are the same as their counterparts in the FIG. 1 construction bear the same reference characters, further explanation of such elements being omitted. The modification shown in FIG. 6 includes means VII attenuating for attenuating an output signal from a detection means IV, such as a tachogenerator, etc., the attenuating means VII being interposed between said detection means IV and the comparator circuit V, and well-known means VIII for varying a frequency from a reference signal generator VI being interposed between said reference signal generator VI and said comparator circuit V, said attenuator means VII and said frequency varying means VIII being operated in the interlocking relation. With this arrangement, the synchronous rotational speed of the D.C. motor II may be varied to drive said motor at a synchronous speed different from that to which it was originally set. It should also be understood that said means for varying a frequency from a reference signal generator may be replaced by, for example, a variable resistor, etc., connected in the reference signal generator.

Figure 7:
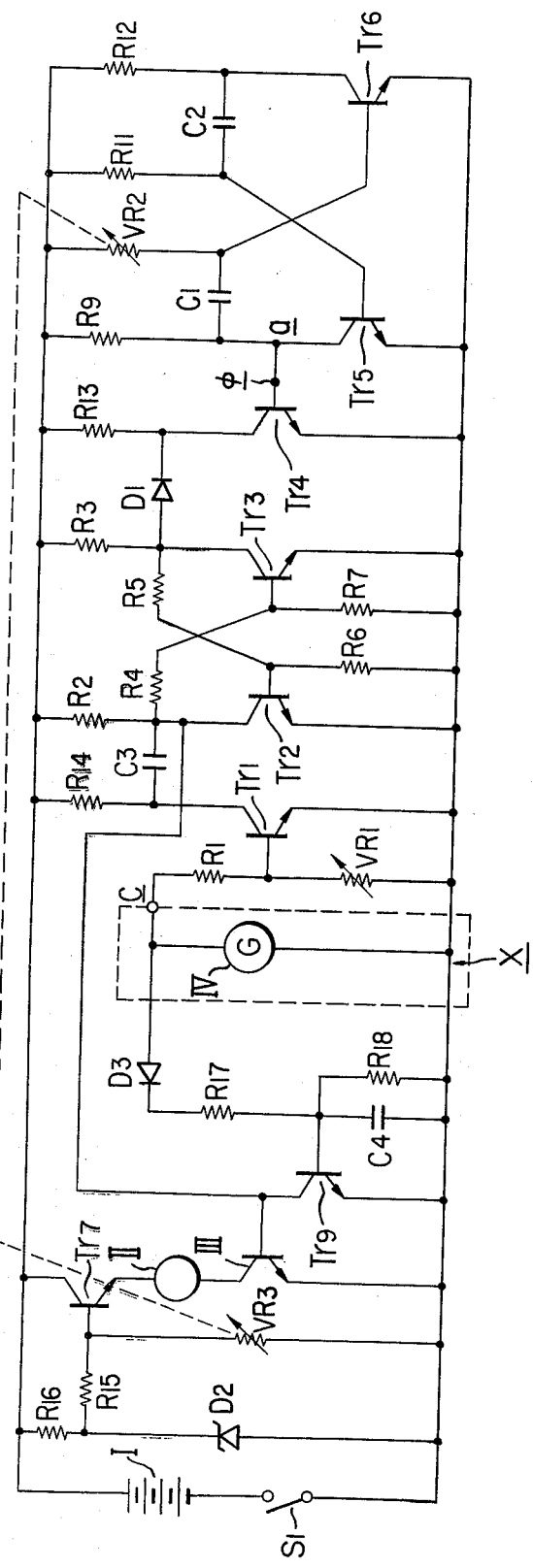
FIG. 7 is a circuit diagram showing another embodiment of the electric circuit further detailed in accordance with the block diagram shown in FIG. 6.

FIG. 7 is a circuit diagram corresponding to the block diagram of FIG. 6. Those elements which are the same as their counterparts in the FIG. 2 construction bear the same reference characters, further explanation of such elements being omitted. In FIG. 7, a diode $D_1$ is connected to the collector of the transistor $Tr_4$ which in turn is connected with the output of the astable multi-vibrator, so that when the transistor $Tr_4$ is in ON condition, its collector-emitter current is directed through the diode $D_1$ to set the bistable multi-vibrator. On the other hand, a capacitor $C_3$ connected to the collector of the transistor $Tr_1$ is activated by the output from the tachogenerator and functions to reset the bistable multi-vibrator. Resistors $R_{13}$ and $R_{14}$ are connected to the diode $D_1$ and capacitor $C_3$ associated therewith, respectively. Transistor $Tr_7$ is provided to regulate a crest value (a maximum value of wave-form of voltage) of a voltage applied to the motor II, and the value of the regulated voltage is determined by way of resistors $R_{15}$ and $R_{16}$, Zener diode $D_2$, and variable resistor $VR_3$. One end of the resistor $R_{15}$ is connected to a divided point between the resistor $R_{16}$ and the Zener diode $D_2$ which themselves are connected in series, across the battery I. The other end of the resistor $R_{16}$ is connected to the base of the transistor $Tr_7$ and to the variable resistor $VR_3$.

Variable resistor $VR_2$ is provided to vary the oscillation frequency of the astable multi-vibrator and is so arranged as to be regulated in association with the variable resistor $VR_3$.

The collector of the NPN transistor $Tr_9$ is connected to the base of the controlling transistor III, and the base of the transistor $Tr_9$ is connected through the resistor $R_{17}$ and the diode $D_3$ to the tachogenerator IV. Capacitor $C_4$ and resistor $R_{18}$ are connected in parallel with the base of the transistor $Tr_9$.

Figure 8:
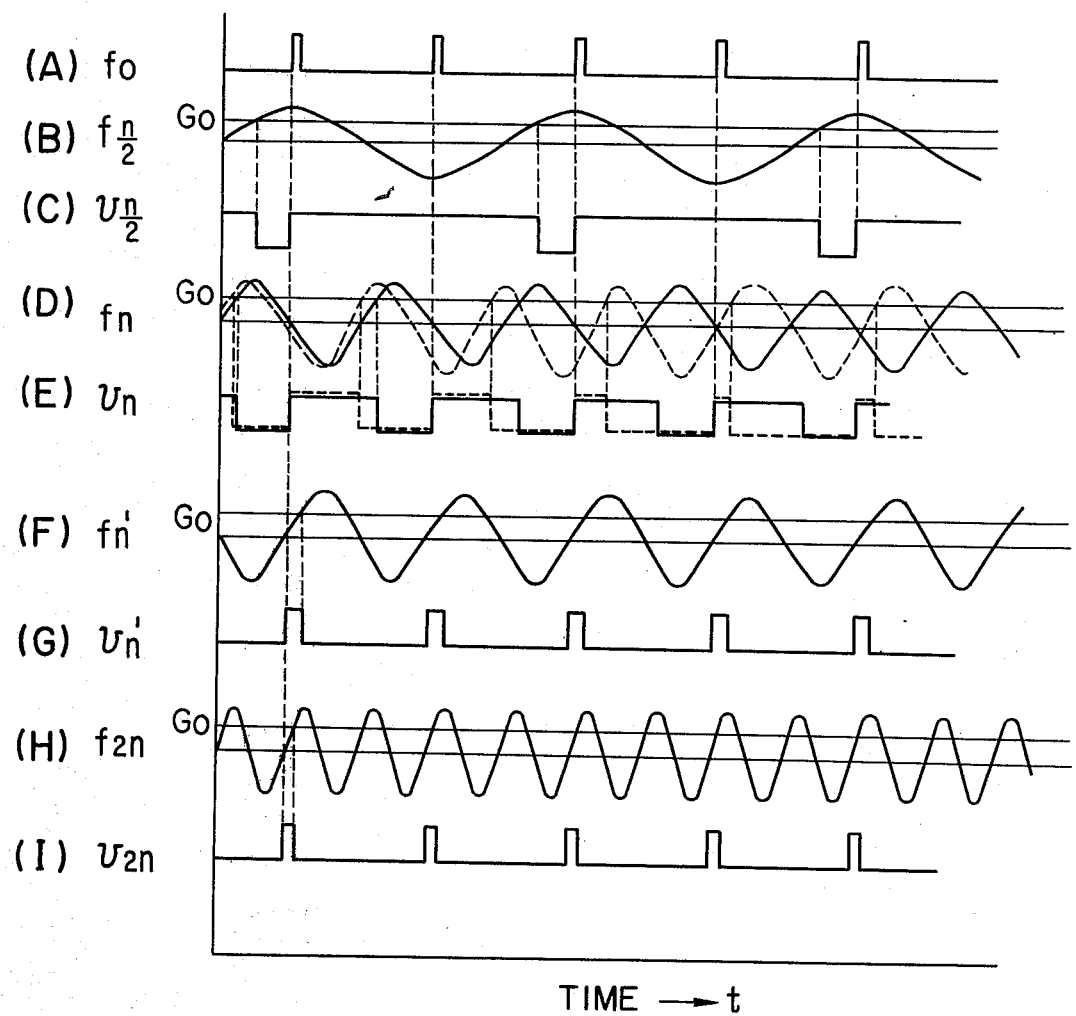
FIGS. 8(A)–(I) are graphic presentations showing variation, by time, of signals at selected points of the electric circuit shown in FIG. 7.

An optimum crest value in controlling a D.C. motor may be obtained by placing the variable resistors $VR_2$ and $VR_3$ in the illustrated electric circuit in interlocking relation. This relationship will now be described with reference to FIG. 8.

The wave-form $f_o$ shown in FIG. 8(A) designates a train of pulse signals in the output terminal $a$ of the astable multi-vibrator shown in FIG. 7, and the wave-form $f(n/2)$ designates an output wave-form of the tachogenerator when the D.C. motor II runs at half the synchronous speed $N_o$. Consequently, the bistable multi-vibrator is reset in response to a signal input in excess of level $G_o$ of the signal $f(n/2)$ and is set in response to an input of the signal $f_o$ to produce an applied voltage signal to the motor having a wave-form as indicated at $V(n/2)$ in FIG. 8(C). The value of level $G_o$ is determined by combination of the resistor $R_1$ and the variable resistor $VR_1$ and may be varied by regulating the variable resistor $VR_1$.

The wave-forms $f_n$ and $V_n$ shown in FIGS. 8(D) and 8(E), respectively, designate an output signal of the tachogenerator and a signal wave-form of the motor applied voltage thereat, when the rotational speed of the D.C. motor has reached its synchronous speed. Further, the wave-forms $f_{n'}$ and $V_{n'}$ shown in FIGS. 8(F) and 8(G), respectively, designate an output signal different in phase from that of said $f_n$ of the tachogenerator and a signal wave-form of the motor applied voltage thereat, when the D.C. motor reached a synchronous speed. The waveforms $f_{2n}$ and $V_{2n}$ shown in FIGS. 8(H) and 8(I) respectively designate an input signal of the tachogenerator and a signal wave-form of the motor applied voltage, in the case where the D.C. motor has its speed twice the synchronous speed. Duty of the motor applied voltage varies as shown in wave-forms $V_n$ and $V_{n'}$ while the D.C. motor runs at a synchronous speed. This is because of the difference of loads applied to the D.C. motor. The wave-form $V_n$ indicates a state where the load is heavier than that indicated by the wave-form $V_{n'}$, and when the load indicated by $V_n$ becomes lighter, the rotational speed of the motor momentarily increases and the output signal of the tachogenerator will have its phase displaced leftwards from one position as indicated by the full line to the other as indicated by the broken line in FIG. 8(D). Consequently, the wave-form of the applied voltage to the motor is displaced in such direction that the duty factor is gradually reduced as indicated by the broken line in FIG. 8(E). This causes the change to the wave-form of the applied voltage as shown at $V_{n'}$ for a light load, and when the motor runs in a normal condition with a light load, wave-forms as shown in $f_{n'}$ and $V_{n'}$ may be obtained.

The mode of variation of time or duty of the applied voltage to the motor due to the variation of speeds in a stabilized condition of the motor speed as described above may be positively and theoretically proved as follows.

That is, if the constant rotational speed of the motor is smaller than a predetermined synchronous speed (see $V(n/2)$, the duty factor D is represented by $½ \leq D \leq 1$.

If the constant rotational speed of the motor is at a synchronous speed (see $V_n$, $V_{n'}$), the result is $0 \leq D \leq 1$.

Further, if the constant rotational speed is greater than the synchronous speed (see $V_{2n}$), the result is $0 \leq D \leq ½$.

From the above, if the crest value of the motor applied voltage is selected so that the duty factor, when the rotational speed of the motor is made constant, is set at approximately ½, the motor runs at a synchronous speed in a stabilized condition. That is, this causes the motor not to run at a speed other than the synchronous speed.

Upon theoretical analysis, the duty $D$ may be represented by $$D \propto V^2/\eta \cdot \tau \cdot n$$

where $V$ is a motor applied voltage; $\eta$ is efficiency of motor; $\tau$ is a torque generated by the motor; and $n$ is the number of revolutions of the motor.

Assuming that $\eta$, $\tau$, and $n$ are constant, the duty $D$ is in proportion to the square of the motor applied voltage. Therefore, the value of $V$, required when the duty is set approximately ½, can be obtained also theoretically.

Considering now the illustrated circuit in FIG. 7, the circuit comprising the diode $D_3$, the resistors $R_{17}$ and $R_{18}$, the capacitor $C_4$ and the transistor $Tr_9$ serves as a circuit in which the motor II is not run at a speed displaced from a synchronous speed, and in other words, the crest value of the motor applied voltage is determined so as to set the duty to be approximately ½. That is, after the motor has been started, or when the speed of the motor becomes greater than a predetermined synchronous speed due to the load fluctuation during synchronous rotation, the controlling element III is deenergized to prevent the motor speed from being increased in excess of the synchronous speed. When the rotational speed of the motor increases, the output of the tachogenerator becomes greater so that the charge applied to the capacitor $C_4$ through the diode $D_3$ and the resistor $R_{17}$ becomes greater, whereby the transistor $Tr_9$ is rendered conductive while the controlling element III is rendered non-conductive.

Figure 9:
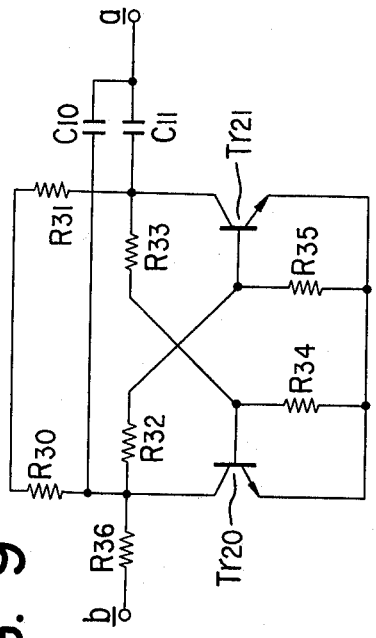
FIG. 9 is a cicuit diagram showing one preferred embodiment of an electric circuit connection, dividing signals generated from a reference signal generator usable in addition to the circuit of FIG. 7.

FIG. 9 illustrates an embodiment of a frequency divider circuit which can be connected between the output terminal $a$ of the astable multi-vibrator and the base terminal $b$ of the transistor $Tr_4$ shown in FIG. 7. A well-known circuit may be employed which comprises resistors $R_{30}$ through $R_{36}$, capacitors $C_{10}$ and $C_{11}$, and transistors $Tr_{20}$ and $Tr_{21}$. This circuit is constructed such that when the terminal $a$ receives an output from the astable multi-vibrator, the frequency thereof is set ½ to be driven out of the terminal $b$, thus constituting frequency varying means for a reference signal.

FIG. 10A is a circuit diagram modified from the circuit portion X in the tachogenerator IV shown in FIGS. 2 and 7. This circuit comprises the tachogenerator IV connected with a variable resistor $VR'_1$ and resistor $R_{40}$ and $R_{41}$, and a pair of transistors $Tr_{30}$ and $Tr_{31}$, common emitter terminal of which is connected to the negative terminal of the power source and common collector terminal of which is connected to the output terminal C. When an A.C. signal as shown in FIG. 10B is produced in the tachogenerator, an output signal of a double frequency as shown in FIG. 10C is produced from the output terminal C. Therefore, this circuit comprises means for varying the frequency of the output signal and means for generating an output signal corresponding to the motor speed.

FIG. 11A is also a circuit diagram modified from the circuit portion X in the tachogenerator IV shown in FIGS. 2 and 7. This circuit comprises the tachogenerator IV, resistors $R_{50}$ through $R_{55}$, a variable resistor VR1, and a pair of transistors $Tr_{40}$ and the common emitter of which is connected to said variable resistor, the collector terminal of the transistor $Tr_{40}$ being connected to the output terminal C. This pair of transistors constitutes a differential amplifier, whereby even if a feeble output as shown in FIG. 11B is produced in the tachogenerator, this output may be amplified to induce an output signal as shown in FIG. 11C.

The frequency conversion means shown in FIG. 10A has the following effect. The increase of the number of poles incorporated in the tachogenerator results in a larger-sized apparatus and more cost, but, by the provision of said conversion means, the high accuracy which is required to detect the rotational speed of motor may be assured without necessitating the increase of the number of poles. Moreover, it has such effect that by the provision of the amplification means shown in FIG. 11A, a high level signal effectively usable as a signal corresponding to the motor speed may be produced even if the output of the tachogenerator is feeble.

In accordance with the present invention, as described above, a current passing through a driving coil in the D.C. motor may be controlled by an output signal from a reference signal generator outside of the motor and a signal responsive to the rotational speed of the D.C. motor, so that the driving current is synchronized with the above-described signals during the constant running, resulting in a hunting as seen in conventional synchronous motors being eliminated and further resulting in the number of revolutions not being fluctuated with respect to loads as experienced in conventional mere D.C. motors. Therefore, the D.C. motor controlled by the apparatus in accordance with the present invention is most suitable for a turn-table driving motor in a record player, a capstan driving motor in a tape recorder, a capstan driving motor in a video tape recorder, and a drum driving motor. The D.C. motor controlled by the apparatus of the present invention is well suited to various motors as noted above, which have as their prerequisites a layer starting torque, excellent constant speed performance, and non-contact control, i.e. without occurrence of noises due to brushes, commutator, or the like. The D.C. motor of the present invention fulfills all of these requirements. Another feature of the present invention resides in the provision of means for variably regulating the synchronous driving speed so that a variable speed D.C. motor may be controlled for its synchronous driving.

I claim:

1. A system for controlling the synchronous drive for direct-current motors comprising a direct-current power source, a direct-current motor connected with said power source, rotational speed detection means for detecting the rotational speed of said direct-current motor and generating a signal in proportion to said speed, means for generating a predetermined reference signal to rotate the direct-current motor at a constant speed, and controlling means for controlling an applied voltage of the direct-current motor, said controlling means including means for receiving both signals as described above and comparing the same to generate a motor-speed controlling signal in response to the output therefrom, and means for regulating a signal applied to the motor disposed in relation to said signal generation means and said rotational speed detection means in order to regulate a crest value of an output generated by said signal generation means, whereby time for applying the voltage to the direct-current motor may be set such that said motor is maintained at a constant speed.

2. A system for controlling the synchronous drive for direct-current motors comprising a direct-current power supply means, a direct-current motor connected to said power supply means, rotational speed detection means for detecting the rotational speed of said direct-current motor and producing frequency signals whose level and frequency are in proportion to the rotational speed, a reference signal generator operative to generate synchronous signals with frequencies of predetermined constant periods, a flip-flop circuit connected to said rotational speed detection means and said reference signal generator and adapted to be set and reset through input signals of predetermined amplitude from said rotational speed detection means and signals from said generator, respectively, and a transistor for controlling the current applied to the motor connected with the output side of said flip-flop circuit and connected in series with the direct-current motor with respect to said power supply means, whereby the applied current to the direct-current motor may be controlled in response to conduction and non-conduction of said transistor to cause said motor to effect self-starting and to be rotated at a constant speed synchronously with an output signal from said reference signal generator after said motor has reached a predetermined synchronous speed.

3. A system as defined in claim 2, further comprising means for amplifying the output signals from said rotational speed detection means, said amplifying means being connected to said rotational speed detection means.

4. A system as defined in claim 2, further comprising means for varying the output signals from said rotational speed detection means, and means for varying the output frequency of said reference signal generator, each of two said means being interlocked with one another.

5. A system for controlling the synchronous drive for direct-current motors comprising a direct-current power source, a direct-current motor connected with said power source, rotational speed detection means for detecting the rotational speed of said direct-current motor and generating a frequency signal corresponding to the value thus detected, reference signal generation means for generating a frequency signal with a predetermined constant period in order to rotate said direct-current motor at a constant speed, a first motor-controlling signal generation circuit for receiving a signal in proportion to said rotational speed and said reference signal, second motor-controlling signal generation means connected with the output side of said circuit and said rotational speed detection means and regulating a crest value of the motor applied voltage, and third motor-controlling signal generation means connected in series with said direct-current power source and connected with the output side of said second motor-controlling signal generation means, whereby said direct-current motor may be driven, through a controlling signal from said means, sychronously with the signal from said reference signal generation means and at a constant speed.

6. A system for controlling a synchronous drive for a direct-current motor comprising:
a. a direct-current power supply means;
b. a direct-current motor interconnected to the direct-current power supply means;
c. rotational speed signal forming means coupled to be driven by said direct-current motor for monitoring the rotational speed of the direct-current motor and operative to produce frequency signals, whose level and frequency are in proportion to said rotational speed;
d. reference signal generation means for generating synchronous signals with frequencies of predetermined constant periods so as to permit said direct-current motor to rotate at a constant speed;
e. cut-off signal producing means connected to receive said frequency signals and operative in response to the level of said frequency signals from the rotational speed signal forming means for producing a cut-off signal upon the detection of any of said frequency signals having a level exceeding a predetermined level; and
f. a control circuit intereconnected with said direct-current motor and said direct-current power supply means, said control circuit also being connected to receive said synchronous signals and operative to establish a power supplying path for the direct-current motor in response to said synchronous signals from the reference signal generation means, said control circuit further being connected to receive said cut-off signal and operable to cut-off said power supplying path for the direct-current motor in response to said cut-off signal from the cut-off signal producing means.

7. A system as defined in claim 6, wherein said rotational speed signal forming means includes a signal generator for generating alternating-current frequency signals.

8. A system as defined in claim 7, wherein said signal generator includes an alternating current tachogenerator.

9. A system as defined in claim 6, wherein said reference signal generation means includes a frequency varying circuit for varying the frequency of the reference signal.

10. A system as defined in claim 7, wherein said cut-off signal producing means responds to the alternating-current bipolar signals from said signal generator and is adapted to detect both bipolar levels of the alternating-current signals.

11. A system for controlling synchronous drive for a direct-current motor comprising:
a. a direct-current power supply means;
b. a direct-current motor interconnected to the direct-current power supply means;
c. rotational speed signal forming means coupled to be driven by said direct-current motor for monitoring the rotational speed of the direct-current motor and operative to produce frequency signals, whose level and frequency are in proportion to said rotational speed;
d. reference signal generation means for generating synchronous signals with frequencies of predetermined constant periods so as to permit said direct-current motor to rotate at a constant speed;
e. cut-off signal producing means connected to receive said frequency signals and operable in response to the level of said frequency signals from the rotational speed signal forming means for producing a cut-off signal upon detection of any of said frequency signals having a level exceeding a predetermined level;
f. a flip-flop circuit interconnected to said cut-off signal producing means and said reference signal generation means, so that signals received from the different means cause the flip-flop circuit to be set and reset; and
g. switching means interconnected to an output of said flip-flop circuit to be switched by said output, said switching means being connected in series with the direct-current motor and the direct-current power supply means for connecting and disconnecting said direct-current motor and said direct-current power supply as said switching means is switched, whereby said switching means is in a connecting condition before the rotational speed of the direct-current motor reaches a predetermined level, and whereby the direct-current motor rotates at a constant speed in synchronism with the output signals from the reference signal producing means after the rotational speed of the direct-current motor has reached the predetermined level.

12. A system as defined in claim 11, wherein said cut-off signal producing means comprises a switching transistor having a predetermined switching level.

* * * * *

UNITED STATES PATENT OFFICE
CERTIFICATE OF CORRECTION

Patent No.     3,971,974          Dated     July 27, 1976

Inventor(s)    TOSHIKAZU ICHIYANAGI

It is certified that error appears in the above-identified patent and that said Letters Patent are hereby corrected as shown below:

Column 5, lines 7-9, change "to waveforms of the motor II will now be described with reference to FIG.3." to --to the motor II will now be described with reference to waveforms of FIG.3.--.

Column 6, lines 32-33, change "means VII attenuating" to --attenuating means VII for attenuating--.

Column 9, line 20, after "and", second occurrence, insert -- $Tr_{41}$, the --.

Signed and Sealed this

Eleventh Day of January 1977

[SEAL]

Attest:

RUTH C. MASON
*Attesting Officer*

C. MARSHALL DANN
*Commissioner of Patents and Trademarks*